(12) United States Patent
Northern et al.

(10) Patent No.: US 12,418,557 B2
(45) Date of Patent: Sep. 16, 2025

(54) SYSTEMS AND METHODS FOR CYBER RISK ASSESSMENT FOR COMPUTING SYSTEMS

(71) Applicant: Tennessee Technological University, Cookeville, TN (US)

(72) Inventors: Bradley Northern, Lebanon, TN (US);
Denis Ulybyshev, Cookeville, TN (US);
Trey Burks, Cookeville, TN (US);
Marlana Hatcher, Moss, TN (US);
Michael Rogers, Cookeville, TN (US)

(73) Assignee: TENNESSEE TECHNOLOGICAL UNIVERSITY, Cookeville, TN (US)

( * ) Notice: Subject to any disclaimer, the term of this patent is extended or adjusted under 35 U.S.C. 154(b) by 345 days.

(21) Appl. No.: 18/149,583

(22) Filed: Jan. 3, 2023

(65) Prior Publication Data

US 2024/0223590 A1    Jul. 4, 2024

Related U.S. Application Data

(60) Provisional application No. 63/267,040, filed on Jan. 21, 2022.

(51) Int. Cl.
*H04L 9/40*    (2022.01)

(52) U.S. Cl.
CPC ...... *H04L 63/1433* (2013.01); *H04L 63/1441* (2013.01); *H04L 63/20* (2013.01)

(58) Field of Classification Search
CPC .. H04L 63/1433; H04L 63/1441; H04L 63/20
See application file for complete search history.

(56) References Cited

U.S. PATENT DOCUMENTS

| | | |
|---|---|---|
| 8,201,257 B1 | 6/2012 | Andres et al. |
| 8,544,098 B2 | 9/2013 | Gustave et al. |

(Continued)

FOREIGN PATENT DOCUMENTS

| | | |
|---|---|---|
| KR | 101941039 B1 | 1/2019 |

OTHER PUBLICATIONS

"Free OPC-UA Library," retrieved from <"https://github.com/FreeOpcUa"> on Jan. 4, 2023.

(Continued)

*Primary Examiner* — Olugbenga O Idowu
(74) *Attorney, Agent, or Firm* — André J. Bahou; Kristen Strickland; Bradley Arant Boult Cummings LLP

(57) ABSTRACT

A computer-implemented method for cyber risk assessment for computing systems may include computing a risk score for a computing system. The computing system may include one or more components. The one or more components may include one or more physical components or one or more software components. The risk score may include a value indicating a risk of exploitation of the computing system. The method may include determining one or more modifications to at least one of the one or more components of the computing system. The one or more modifications may increase the security of the computing system. The method may include performing a sensitivity analysis on the computing system. The method may include generating an order of reconfiguring or replacing vulnerable components of the computing system. The method may include performing a defensive action on the computing system.

4 Claims, 4 Drawing Sheets

(56) References Cited

U.S. PATENT DOCUMENTS

| | | | |
|---|---|---|---|
| 8,789,192 B2 | 7/2014 | LaBumbard | |
| 9,117,069 B2 | 8/2015 | Oliphant et al. | |
| 9,251,351 B2 | 2/2016 | Hugard, IV et al. | |
| 10,404,737 B1 | 9/2019 | Sweeney et al. | |
| 10,498,756 B2 | 12/2019 | Yampolskiy et al. | |
| 10,616,258 B2 | 4/2020 | Liang | |
| 11,038,784 B2 | 6/2021 | Nickolov et al. | |
| 2014/0136901 A1* | 5/2014 | Butler | G06F 11/3003 714/38.1 |
| 2014/0137257 A1 | 5/2014 | Martinez et al. | |
| 2017/0295197 A1 | 10/2017 | Parimi et al. | |
| 2022/0060512 A1* | 2/2022 | Crabtree | G06F 16/951 |

OTHER PUBLICATIONS

Advantech, "WebAccess/SCADA—WebAccess—Advantech," retrieved from <"https://www.advantech.com/en/industrial-automation/webaccess/webaccessscada"> on Jan. 4, 2023.

Aksu, M. Ugur, et al., "A Quantitative CVSS-Based Cyber Security Risk Assessment Methodology For IT Systems," 2017 International Carnahan Conference on Security Technology (ICCST), Oct. 23-26, 2017, pp. 1-8.

Allodi, Luca, et al., "A Preliminary Analysis of Vulnerability Scores for Attacks in Wild," Badgers '12: Proceedings of the 2012 ACM Workshop on Building analysis datasets and gathering experience returns for security, Oct. 2012, pp. 17-24.

Brinqa, "Cybersecurity Risk Management and Analytics—Bringa," retrieved from <"https://www.bringa.com/"> on Jan. 4, 2023.

Chang, Yung-Yu, et al., "Trend Analysis of the CVE for Software Vulnerability Management," 2011 IEEE International Conference of Privacy, Security, Risk, and Trust, and IEEE International Conference on Social Computing, Oct. 9-11, 2011, pp. 1290-1293.

Chavez, Adrian R., "Moving Target Defense to Improve Industrial Control System Resiliency," Industrial Control Systems Security and Resiliency, Advances in Information Security, vol. 75. Springer, Cham., Aug. 30, 2019, Online ISBN 978-3-030-18214-4.

Clark-Carter, D., "Measures of Central Tendency," International Encyclopedia of Education (Third Edition), Elsevier, 2010, pp. 264-266, ISBN 9780080448947.

Fielding, R.T., et al., "Architectural Styles and the Design of Network-Based Software Architectures," University of California: Irvine, California, USA, 2000; vol. 7.

Forum of Incident Response and Security Teams, Inc., "Common Vulnerability Scoring System version 3.1," 2019, retrieved Jun. 17, 2021.

Forum of Incident Response and Security Teams, Inc., "Exploit Prediction Scoring System (EPSS)," 2021, retrieved from <"https://www.first.org/epss/model"> on Jan. 3, 2023.

Free Software Foundation, Inc., "GNU Bash," retrieved from <"https://www.gnu.org/software/bash/"> on Jan. 4, 2023.

Hackerone, "How HackerOne Helps the Vulnerability Management Process," Apr. 29, 2021, retrieved from <"https://www.hackerone.com/vulnerability-management/how-hackerone-helps-vulnerability-management-process"> on Jan. 3, 2023.

Ignition Maker Edition, retrieved from <"https://docs.inductiveautomation.com/display/DOC81/Ignition+Maker+Edition"> on Jan. 4, 2023.

Jacobs, Jay, et al., "Improving vulnerability remediation through better exploit prediction," Journal of Cybersecurity, vol. 6, Issue 1, Sep. 14, 2020.

Macgill, C., "Cartesian Products and Relations." retrieved from <"https://www.math.uvic.ca/faculty/gmacgill/guide/RF.pdf"> on Mar. 8, 2021.

Markakis, Evangelos, et al. "Security assessment as a service cross-layered system for the adoption of digital, personalised and trusted healthcare." 2019 IEEE 5th World Forum on Internet of Things (WF-IoT). IEEE, Apr. 15-18, 2019.

Markakis, Evangelos, et al., "Acceleration at the edge for supporting smes security: The fortika paradigm," IEEE Communications Magazine, vol. 57, No. 2, pp. 41-47, Feb. 2019.

Netflix, "Eureka at a glance", Dec. 18, 2014, retrieved from <"https://github.com/Netflix/eureka/wiki/Eureka-at-a-glance"> on Jan. 4, 2023.

Nikoloudakis, Yannis, et al., "Towards a Machine Learning Based Situational Awareness Framework for Cybersecurity: An SDN Implementation," Sensors 2021, 21(14), 4939, Jul. 20, 2021.

Saltstack, Inc., "Salt Project," retrieved from <"https://docs.saltproject.io/en/latest/topics/about_salt_project.html#about-salt"> on Jan. 4, 2023.

Schlette, Daniel, et al., "Security Enumeration for Cyber-Physical Systems," Data and Applications Security and Privacy XXXIV. DBSec 2020. Lecture Notes in Computer Science(), vol. 12122. Springer, Cham., Jun. 18, 2020, pp. 64-76.

Sengupta, Sailik, "Moving Target Defense: A Symbolic Framework for AI & Security," Proceedings of the 16th International Conference on Autonomous Agents and Multiagent Systems (AAMAS 2017), May 8-12, 2017, pp. 1861-1862.

Spring, J.M., et al., "Towards Improving CVSS," Software Engineering Institute, Carnegie Mellon University, Dec. 2018.

Tenable, "Calculating Known and Unknown Risk: The Math Behind the Cyber Exposure Score," Jan. 6, 2021.

Toupas, P., et al., "An Intrusion Detection System for Multi-class Classification Based on Deep Neural Networks," 2019 18th IEEE International Conference On Machine Learning And Applications (ICMLA), Dec. 16-19, 2019, pp. 1253-1258.

Tripathi, Anshu, et al., "On Prioritization of Vulnerability Categories Based on CVSS Scores," 2011 6th International Conference on Computer Sciences and Convergence Information Technology (ICCIT), Nov. 29, 2011, pp. 692-697.

Ulybyshev, D., "Protecting Electronic Health Records in Transit and at Rest," 2020 IEEE 33rd International Symposium on Computer-Based Medical Systems (CBMS), Jul. 28-30, 2020, pp. 449-452.

Vulners, "Vulners—Vulnerability Database," retrieved from <"https://vulners.com"> on Oct. 28, 2021.

Zoho Corporation Pvt. Ltd., "Vulnerability Management Tool & Software—ManageEngine," retrieved from <"https://www.manageengine.com/vulnerability-management/"> on Jan. 4, 2023.

* cited by examiner

| Name ← 302 | Version ← 304 | Risk Score ← 306 | |
|---|---|---|---|
| Intel i7-13700K | 1.0 | 1.3 | ← 308(1) |
| A-Tech 19200 | 1.1 | 4.6 | ← 308(2) |
| MSI MAG B650 | 1.0 | 1.2 | ← 308(3) |
| Windows XP | 1.7 | 3.8 | ← 308(4) |
| Adobe Acrobat | 20.202 | 7.9 | ← 308(5) |
| Microsoft Word | 2016 | 2.4 | ← 308(6) |

FIG. 3

SYSTEMS AND METHODS FOR CYBER RISK ASSESSMENT FOR COMPUTING SYSTEMS

CROSS-REFERENCES TO RELATED APPLICATIONS

This non-provisional patent application claims priority to U.S. Provisional Patent Application No. 63/267,040, filed Jan. 21, 2022, entitled SYSTEMS AND METHODS FOR CYBER RISK ASSESSMENT FOR COMPUTING SYSTEMS, which is hereby incorporated by reference in its entirety.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

BACKGROUND OF THE DISCLOSURE

The present disclosure generally relates to cybersecurity, and more particularly to systems and methods for cyber risk assessment for computing systems.

Software and hardware used in many kinds of computing systems have a substantial number of vulnerabilities that attackers can exploit. These vulnerabilities may occur because existing software and hardware are not up-to-date or they are not properly configured. Furthermore, some software, hardware, and network protocols were designed without cybersecurity in mind.

What is needed, then, are systems and methods for cyber risk assessment for computing systems.

BRIEF SUMMARY

This Brief Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One aspect of the disclosure is a computer-implemented method for cyber risk assessment for computing systems. The method may include computing a risk score for a computing system. The computing system may include one or more components. The one or more components may include one or more physical components or one or more software components. The risk score may include a value indicating a risk of exploitation of the computing system. The method may include determining one or more modifications to at least one of the one or more components of the computing system. The one or more modifications may increase the security of the computing system. The method may include performing a sensitivity analysis on the computing system. The method may include generating an order of reconfiguring or replacing vulnerable components of the computing system. The method may include performing a defensive action on the computing system.

Another aspect of the disclosure is a system for cyber risk assessment for computing systems. The system may include a gateway server, which may include a discovery client or a defense client. The gateway client may be in data communication with a computing system. The system may include a discovery server in data communication with the gateway server. The system may include an analytics server, which may include a discovery client or a risk score calculator microservice. The analytics server may be in data communication with the discovery server and a vulnerabilities database. The risk score calculator microservice may be configured to compute a risk score for a computing system. The computing system may include one or more components. The one or more components may include one or more physical components and one or more software components. The risk score may include a value indicating a risk of exploitation of the computing system. The risk score calculator microservice may be configured to determine one or more modifications to at least one of the one or more components of the computing system. The one or more modifications may increase the security of the computing system. The risk score calculator microservice may be configured to perform a sensitivity analysis on the computing system and generate an order of reconfiguring or replacing vulnerable components of the computing system. The defense client may be configured to perform a defensive action on the computing system.

Another aspect of the disclosure may include another computer-implemented method for cyber risk assessment for computing systems. The method may include computing a risk score for a computing system. The computing system may include one or more components. The one or more components may include one or more physical components or one or more software components. The risk score may include a value indicating a risk of exploitation of the computing system. The method may include determining one or more modifications to at least one of the one or more components of the computing system. The one or more modifications may increase the security of the computing system. The method may include performing a sensitivity analysis on the computing system. The method may include generating an order of reconfiguring or replacing vulnerable components of the computing system. The method may include performing a defensive action on the computing system. Performing the defensive action on the computing system may include performing a moving target defensive action. The method may include reconfiguring or replacing the first component in the order of reconfiguring or replacing vulnerable components of the computing system.

The systems, methods, apparatuses, and other aspects of the disclosure improve the functioning of a computer, improve computer system security, and improve the technical field of cybersecurity and cyber-physical systems. In other words, the disclosure herein provides technological solutions to technological problems. The systems and methods disclosed compute a risk score for the computing system at issue by obtaining information about the computing system (including information about its individual components) and calculating a risk score of the computing system based on the information. Such information includes data relevant to the individual components, including their version numbers and model identifiers. The systems and methods are able to use this information to obtain data from vulnerability databases and combine multiple component risks scores derived from the database search results and other sources to automatically generate an overall risk score for the computing system. Thus, the systems and methods herein can automatically determine a risk score for both individual components and the overall computing system.

However, the systems and methods of the disclosure go further by simulating changes to these components to automatically determine which component additions, removals, or replacements would have a greater impact on the overall risk score for the computing system. The systems and methods order these changes so users of the computing system can prioritize the changes to be made based on a variety of factors such as system security risk, system downtime, or ease of replacement. Thus, the systems and methods can automatically select which components to add, remove, or replace to have the largest impact on improving the security of the computing system.

The systems and methods go even further by automatically performing defensive actions on the computing system before such component changes can be made. This includes cybersecurity defense actions such as changing Internet Protocol (IP) addresses or port numbers of computing devices of the computing system. Thus, the security of the computing system is improved immediately and automatically.

Additionally, the microservice architecture of the systems and methods disclosed herein provides several improvements to computing functionality and cybersecurity systems. The microservice architecture leverages the efficiency of computing resources and allows the system to more broadly serve a variety of computing systems. With a microservice design, the system can fully support a REpresentational State Transfer (REST) implementation. Each microservice may use a RESTful process in which they communicate with each other. Some of the microservices are implemented using an application framework that allows the system to easily adapt to different needs with the use of dependency injections. A discovery service may allow one or more microservices of the system to communicate with each other without hard coding ports or IP addresses, as these types of data can change on-the-fly. Using a discovery service may be easier to load balance, for example, when a system administrator needs to load more services due to high traffic times. The microarchitecture also operates in an unconventional fashion to bring about the cyber security enhancements. Conventional microstructure architecture has not been applied in the realm of cyber security and certainly not in the specific arrangements described herein.

The discovery service model of the system may include functionality that handles functions in which a client or service can look up the name of a service then send requests. The discovery service model may include advanced caching. If a service route disappears, the service may cache the previous route for that service so the client may not have to wait for the connection to re-appear. A discovery client may send out heartbeats to the service registry as a service. These are sent in case another service needs to know where it is located on a server or in the cloud. This may allow the service to be dynamically load balanced.

By analyzing the computing system's configuration to detect vulnerable components, the systems and methods disclosed herein can generate a reconfiguration order based on system needs and preferences and can automatically reconfigure or replace certain components. The systems and methods allow computing system designers and operators to determine secure configurations for newly designed computing systems and components to reconfigure or replacing existing computing systems. The systems and methods allow such personnel to evaluate how replacing one or more components may affect the overall risk score. The systems and methods are an improvement to computing technology because they result in improving the security of the computing system, including automatically improving the security by automatically replacing certain components of the computing system.

Numerous other objects, advantages and features of the present disclosure will be readily apparent to those of skill in the art upon a review of the following drawings and description of various embodiments.

BRIEF DESCRIPTION OF THE DRAWINGS

FIG. 3 is a table illustrating one embodiment of component data of a computing device in a system for cyber risk assessment for computer systems.

DETAILED DESCRIPTION

Figure 1:
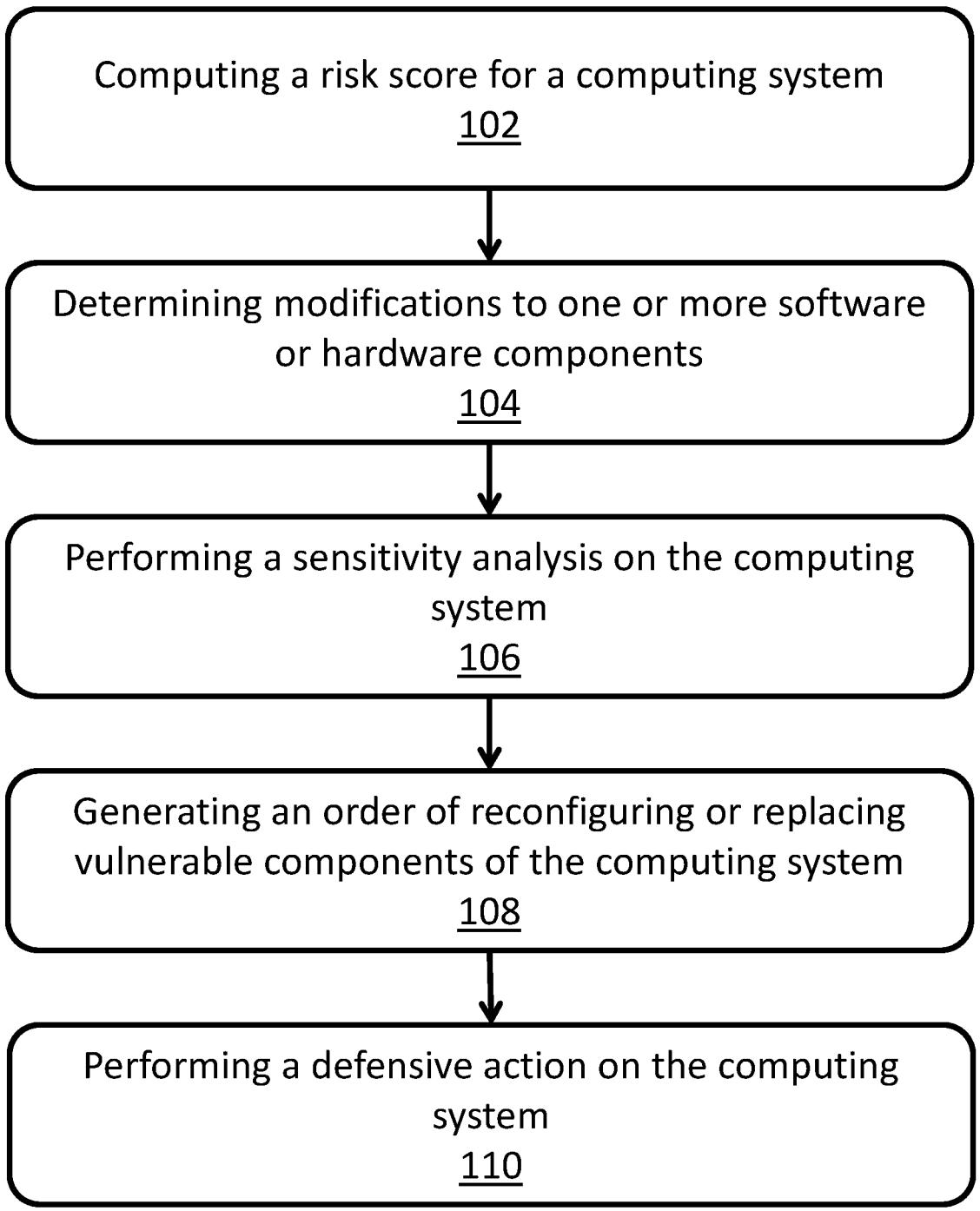
FIG. 1 is a flowchart diagram illustrating one embodiment of a method for cyber risk assessment for computing systems.

While the making and using of various embodiments of the present disclosure are discussed in detail below, it should be appreciated that the present disclosure provides many applicable inventive concepts that are embodied in a wide variety of specific contexts. The specific embodiments discussed herein are merely illustrative of specific ways to make and use the disclosure and do not delimit the scope of the disclosure. Those of ordinary skill in the art will recognize numerous equivalents to the specific apparatus and methods described herein. Such equivalents are considered to be within the scope of this disclosure and are covered by the claims.

In the drawings, not all reference numbers are included in each drawing, for the sake of clarity. In addition, positional terms such as "upper," "lower," "side," "top," "bottom," etc. refer to the apparatus when in the orientation shown in the drawing. A person of skill in the art will recognize that the apparatus can assume different orientations when in use.

Reference throughout this specification to "one embodiment," "an embodiment," "another embodiment," or similar language means that a particular feature, structure, or characteristic described in connection with the embodiment is included in at least one embodiment. Thus, appearances of the phrases "in one embodiment," "in an embodiment," "in some embodiments," and similar language throughout this specification may, but do not necessarily, all refer to the same embodiment, but mean "one or more but not necessarily all embodiments" unless expressly specified otherwise.

The terms "including," "comprising," "having," and variations thereof mean "including but not limited to" unless expressly specified otherwise. An enumerated listing of items does not imply that any or all of the items are mutually exclusive or mutually inclusive, unless expressly specified otherwise. As used herein, the term "a," "an," or "the" means "one or more" unless otherwise specified. The term "or" means "and/or" unless otherwise specified.

Multiple elements of the same or a similar type may be referred to as "Elements 102(1)-(n)" where n may include a number. Referring to one of the elements as "Element 102" refers to any single element of the Elements 102(1)-(n). Additionally, referring to different elements "First Elements 102(1)-(*n*)" and "Second Elements 104(1)-(*n*)" does not necessarily mean that there must be the same number of First Elements as Second Elements and is equivalent to "First Elements 102(1)-(*n*)" and "Second Elements (1)-(*m*)" where m is a number that may be the same or may be a different number than n.

As used herein, the term "computing device" may include a desktop computer, a laptop computer, a tablet computer, a mobile device such as a mobile phone or a smart phone, a smartwatch, a gaming console, an application server, a database server, or some other type of computing device. A computing device may include a physical computing device or may include a virtual machine (VM) executing on another computing device. A computing device may include a cloud computing system, a distributed computing system, or another type of multi-device system.

As used herein, the term "data network" may include a local area network (LAN), wide area network (WAN), the Internet, or some other network. A data network may include one or more routers, switches, repeaters, hubs, cables, or other data communication components. A data network may include a wired connection or a wireless connection.

As used herein, the terms "determine" or "determining" may include a variety of actions. For example, "determining" may include calculating, computing, processing, deriving, looking up (e.g., looking up in a table, a database or another data structure), ascertaining, or other actions. Also, "determining" may include receiving (e.g., receiving information or data), accessing (e.g., accessing data in a memory, data storage, distributed ledger, or over a network), or other actions. Also, "determining" may include resolving, selecting, choosing, establishing, or other similar actions.

As used herein, the terms "provide" or "providing" may include a variety of actions. For example, "providing" may include generating data, storing data in a location for later retrieval, transmitting data directly to a recipient, transmitting or storing a reference to data, or other actions. "Providing" may also include encoding, decoding, encrypting, decrypting, validating, verifying, or other actions.

As used herein, the term "access," "accessing", and other similar terms may include a variety of actions. For example, accessing data may include obtaining the data, examining the data, or retrieving the data. Providing access or providing data access may include providing confidentiality, integrity, or availability regarding the data.

As used herein, the term "message" may include one or more formats for communicating (e.g., transmitting or receiving) information or data. A message may include a machine-readable collection of information such as an Extensible Markup Language (XML) document, fixed-field message, comma-separated message, or another format. A message may, in some implementations, include a signal utilized to transmit one or more representations of information or data.

As used herein, the term "user interface" (also referred to as an interactive user interface, a graphical user interface or a UI), may refer to a computer-provided interface including data fields or other controls for receiving input signals or providing electronic information or for providing information to a user in response to received input signals. A user interface may be implemented, in whole or in part, using technologies such as hyper-text mark-up language (HTML), a programming language, web services, or rich site summary (RSS). In some implementations, a user interface may be included in a stand-alone client software application configured to communicate in accordance with one or more of the aspects described.

As used herein, the term "modify" or "modifying" may include several actions. For example, modifying data may include adding additional data or changing the already-existing data. As used herein, the term "obtain" or "obtaining" may also include several types of action. For example, obtaining data may include receiving data, generating data, designating data as a logical object, or other actions. For example, obtaining a verifiable credential may include designating a credential and digital signatures of the credential.

FIG. 1 depicts one embodiment of a method 100. The method 100 may include a method for cyber risk assessment for computing systems. The method 100 may include computing a risk score for a computing system (step 102). Computing the risk score may include computing a risk score for one or more software components or hardware components of the computing system. Computing the risk score may include computing a risk score for the overall computing system (which may be based on one or more risk scores of the software or hardware components). The method 100 may include determining modifications to one or more software or hardware components of the computing system in order to increase the security of the computing system (step 104). Modifications may include adding a component, removing a component, or replacing a component. The method 100 may include performing a sensitivity analysis on the computing system (step 106). The sensitivity analysis may include a "What if?" analysis that may hypothetically modify one or more components of the computing system to determine how the modification would change a risk score. The method 100 may include generating an order of reconfiguring or replacing vulnerable components of the computing system (step 108). The order may include an order that may assist in minimizing downtime for the computing system and increasing the security of the computing system. The method 100 may include performing a defensive action on the computing system (step 110). The defensive action may include a moving target defensive action.

Figure 2:
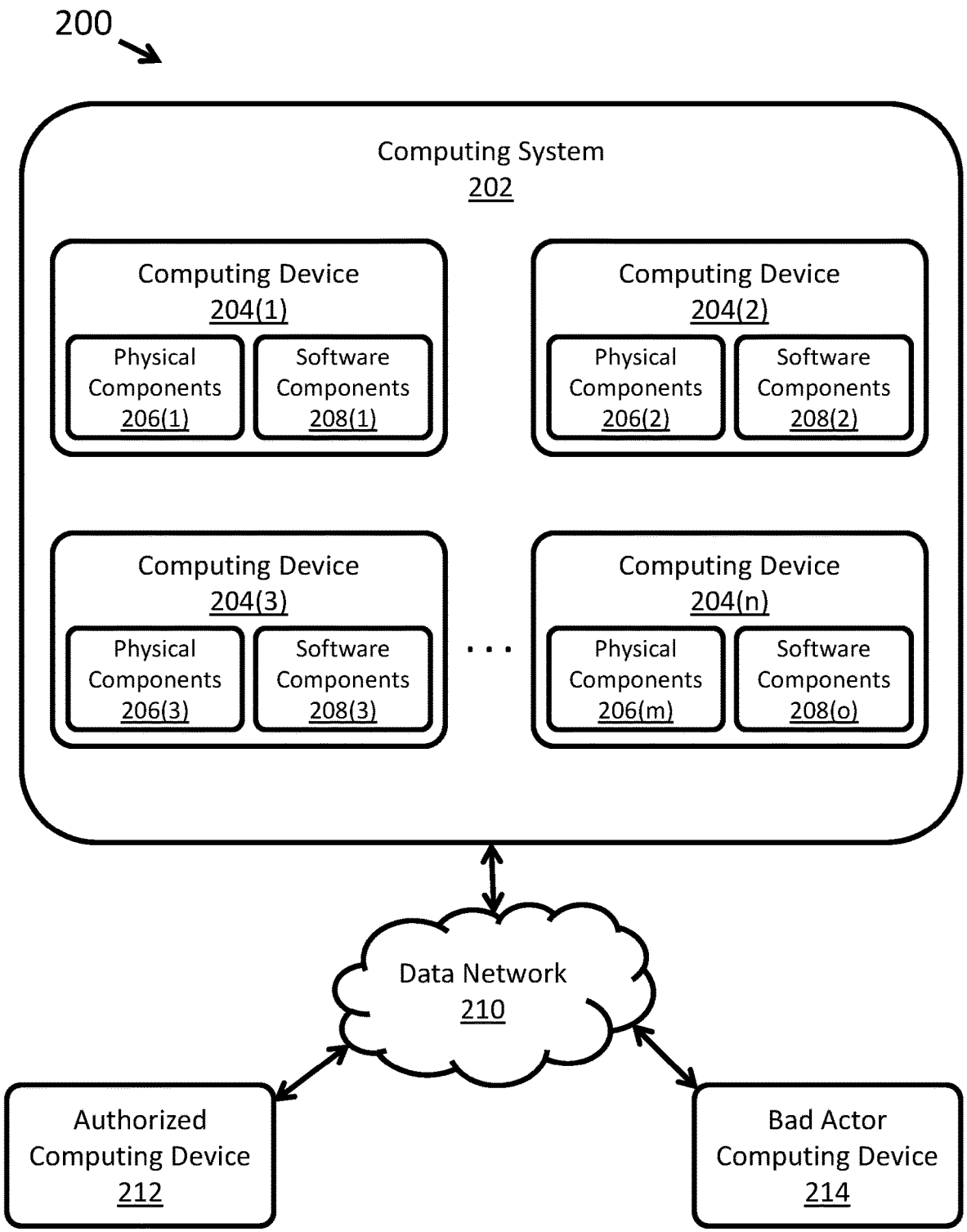
FIG. 2 is a schematic block diagram illustrating one embodiment of a system for cyber risk assessment for computing systems.

Further details about the method 100 and the systems that implement the method 100 are now discussed. FIG. 2 depicts one embodiment of a system 200. The system 200 may include the computing system 202 of step 102. In one embodiment, the computing system 202 may include one or more computing devices 204(1)-(*n*). The computing system 202 may include a cyber-physical system (CPS). The computing system 202 may include an industrial control system. The computing system 202 may include a supervisory control and data acquisition (SCADA) system. The computing system 202 may include an enterprise computing system. The computing system 202 may include cloud computing system, a distributed computing system, or some other type of computing system. The computing devices 204(1)-(*n*) may each include one or more physical components 206 and one or more software components 208. A physical component 206 may include a physical device installed on the computing device 204. A physical component 206 may include a processor, a core, a motherboard, a chip, a memory, a disk drive, an expansion card, a peripheral device (e.g., a mouse, a keyboard, an image scanner, a webcam, a monitor, a speaker, a removable data storage device, etc.), or some other physical component. A software component 208 may include a piece of software installed on or accessible from the computing device 204. A software component 208 may include application software, system software (e.g., an operating system, device drivers, utilities), web applications, plugins, embedded software (e.g., firmware), or other software components. In some embodiments, the computing devices 204(1)-(n) may be in data communication with each other over a data network. The computing system 202 may be connected to a data network 210. Other computing devices may be in data communication with the computing system over the data network 210, such as an authorized computing device 212 or a bad actor's computing device 214.

In one or more embodiments, the risk score for the computing system 202 may include a value that may indicate a risk that the computing system 202 may be exploited by a bad actor. The value may include a numeric value. The value may fall within a range where one end of the range indicates a low risk of exploitation and the opposite end of the range indicates a high risk of exploitation. The value may be such that different risk scores can be compared to indicate that one computing system 202 is more at risk than others, or that the same computing system 202 is more at risk with one configuration than a different configuration. The risk score for the computing system 202 may sometimes be referred to as "the overall risk score." The bad actor may include a security hacker, a state actor, or some other person or entity whose access to or use of the computing system 202 is unauthorized by the entity that owns or operates the computing system 202.

In certain embodiments, computing the risk score for the computing system 202 (step 102) may include computing a risk score for a software or hardware component 206, 208 of the computing system 202. This risk score for the component 206, 208 may be referred to as a "component risk score." The component risk score may serve a similar purpose to the overall risk score, however, the component risk score may reflect a risk of exploitation focused on the component 206, 208 instead of the computing system 202. A component risk score may be calculated for each component 206, 208 of one or more components 206, 208 of the computing system. In one embodiment, computing a component risk score for each component 206, 208 of one or more software or hardware components 206, 208 may include obtaining data indicating the presence of a certain piece of software or hardware on the computing system 202. In some embodiments, a component risk score may be based on component data about the component 206, 208. The component data may include data that describes the component 206, 208. In one embodiment, a system administrator or other user of the computing system 202 may input at least a portion of the component data. The component data may include the name of the software/hardware component 206, 208, a version number, a model name/number, a serial number, or other information. In another embodiment, the system implementing the method 100 may scan the computing system 202 being evaluated to automatically detect the software and hardware components 206, 208 of the computing system 202 or the component data. Obtaining the component data may include the system obtaining the component data from an external computing device via an API, a database lookup, or some other manner. In one embodiment, step 102 may include compiling list of the component data for one or more components 206, 208 of the computing system 202.

In some embodiments, computing a component risk score for one or more software components or hardware components 206, 208 (as part of step 102) may include computing the component risk score for that component 206, 208 based on a score from a database or a system. The database/system may include the Common Vulnerabilities and Exposures (CVE) system, the United States National Vulnerability Database, the Common Vulnerability Scoring System (CVSS), or some other system. Computing a component risk score for a component 206, 208 may include using the component data for that component 206, 208 (e.g., name, version number, etc.) to perform a search in one or more of the databases/systems and obtain a risk score from the databases/systems.

FIG. 3 depicts one embodiment of a table including a partial display of component data for a computing device 204 and the associated components' 206, 208 component risk scores. The table displays the name 302, version 304, and risk score 306 of each component 206, 208. Each row 308(1)-(5) of the table corresponds to one component 206, 208. For example, row 308(1) corresponds to an INTEL i7-13700K processor with a version of 1.0 and a risk score of 1.3. Row 308(5) corresponds to an ADOBE ACROBAT software program with a version of 20.202 and risk score of 7.9. In some embodiments, a computing device 204 may include more or fewer components 206, 208, and the table may include more or less component data.

Step 102 may include combining the component risk scores of the individual software/hardware components 206, 208 to determine the overall risk score for the computing system 202. In one embodiment, combining the component risk scores of the individual software/hardware components 206, 208 may include calculating a weighted average. Using a weighted average may allow for the components 206, 208 with component higher risk scores to have more influence on mitigation tactics used and may allow for software or hardware with few, but high-rated, scores to be taken into account and not cast aside. Additionally, because the number of component vulnerabilities is finite, a weighted average may suit the data.

In one embodiment, the weighted average may be calculated according to the equation:

$$\text{risk score} = \frac{\sum_{i=1}^{n} w_i x_i}{\sum_{i=1}^{n} w_i}$$

where n is the number of individual component risk scores, $w_i$ is a non-negative real number representing the weight, and $x_i$ is the component risk score for the component 206, 208. The weight, $w_i$, may be obtained from the table below:

| Severity Ranges    | Weights A | Weights B | Weights C |
| ------------------ | --------- | --------- | --------- |
| Low (0.1-3.9)      | 0.1       | 0.1       | 0.1       |
| Medium (4.0-6.9)   | 0.2       | 0.2       | 0.2       |
| High (7.0-8.9)     | 0.5       | 0.6       | 0.9       |
| Critical (9.0-10.0)| 1.5       | 1.6       | 4.4       | where a column of weights is selected and the weight $w_i$ is determined based on where value of $x_i$ falls in the severity ranges. For example, if the column "Weights A" is selected and the value of $x_1$ is 7.7, then $w_1$ is 0.5. In another example, if the column "Weights B" is selected and the value of $x_1$ is 9.1, then $w_1$ is 1.6. An example of this function can be seen below:

```
Double weightedAverage(List<Double> v2or3){
    Double totSum =0.0;
    Double weightedSum = 0.0;
    Double weightedScore = 0.0;
    Double weight = 0.0;
```

-continued

```
for(Double curr: v2or3){
    if (curr == 0.1 && curr <= 3.9) {
        weight = 0.1;
            weightedScore = weight * curr;
            weightedSum += weight;
    }
    else if (curr >= 4.0 && curr <=6.9){
        weight = 0.2;
            weightedScore = weight * curr;
            weightedSum += weight;
    }
    else if (curr >= 7.0 && curr <=8.9){
        weight = 0.9;
            weightedScore = weight * curr;
            weightedSum += weight;
    }
    else if (curr >= 9.0 && curr <=10.0){
        weight = 4.4;
            weightedScore = weight * curr;
            weightedSum += weight;
    }
    else if (curr> 10.0){
    }
    totSum += weightedScore;
}
Double weightedAvg = totSum /weightedSum;
return weightedAvg;
}
```

While weighted average has been discussed as a manner of calculating the overall risk score of the computing system, other manners of calculating the overall risk score may be used. Furthermore, while the above table has been discussed, the weights used in calculating a weighted average regarding the overall risk score may use other weight values, which may be higher or lower than those disclosed above.

In some embodiments, determining modifications to one or more software or hardware components 206, 208 of the computing system (step 104) may include adding a component 206, 208 to the list of components 206, 208 of the computing system 202, discussed above. The overall risk score for the computing system 202 may then be recalculated to be further based on the newly added component 206, 208. In one embodiment, step 104 may include removing a component 206, 208 from the list of components 206, 208 of the computing system 202 and then recalculating the overall risk score for the computing system 202 further based on the removed component 206, 208. In some embodiments, step 104 may include replacing a component 206, 208 from the list with a different component 206, 208. Replacing a component 206, 208 may include the combination of removing the component 206, 208 and adding one or more other components 206, 208 to the list. In some embodiments, replacing a component 206, 208 may include changing the component 206, 208 to a different version of the same component 206, 208 (e.g., updating the component 206, 208 to a newer version or rolling the component 206, 208 back to a previous version).

In some embodiments, a system implementing step 104 may include a database, an application programming interface (API), or other data source that includes a component 206, 208 and a list of one or more different components 206, 208 that may be a replacement for the component 206, 208.

In one embodiment, step 106 may include adding, removing, or replacing multiple components 206, 208 of the computing system 202 in order to calculate multiple overall risk scores for the computing system 202. A system implementing step 106 may store one or more of the calculated overall risk score or the components risks scores. In this manner, different possible configurations of the computing system 202 can be compared to one another or compared to the current configuration and its overall risk score.

In one or more embodiments, generating an order of reconfiguring or replacing vulnerable components of the computing system 202 (step 108) may include selecting an overall risk score calculated during steps 102-106. The overall risk score may include the current risk score for the computing system 202 (as calculated in step 102) or one of the calculated overall risk scores based on a modification to the computing system 202 (as calculated in steps 104-106). In some embodiments, the order of reconfiguration may include the list of software/hardware components 206, 208 of the computing system 202 ordered from highest component risk score to lowest component risk score.

In some embodiments, the order of reconfiguration may include the list of software/hardware components 206, 208 ordered by how much removing or replacing the component 206, 208 affects the component risk score for that component 206, 208. For example, Component A may include a component risk score of 7.7, and a replacement component 206, 208 may include a component risk score of 1.2. Component B may include a component risk score of 9.9, and a replacement component 206, 208 may include a component risk score of 9.6. Thus, Component A would be listed higher than Component B. In one embodiment, the order of reconfiguration may include the list of software/hardware components 206, 208 ordered by how much removing or replacing the component 206, 208 affects the overall risk score for the computing system. For example, the overall risk score may be 8.1, and replacing Component C with a different component 206, 208 may lower the overall risk score to 6.2. Replacing Component D with a different component 206, 208 may lower the overall risk score 5.7. Thus, Component D would be listed higher than Component C.

In one embodiment, the order of reconfiguration may include the list of software/hardware components 206, 208 ordered by how much downtime would be required to modify the component 206, 208. The list may order the components 206, 208 from least downtime to most downtime. A system that implements step 108 may include a database, API, or other data source that includes a component 206, 208 and an estimated time to modify the component 206, 208. The estimated time may be based on an amount of time to download a replacement software component 208 (which, in turn, may be based on a file size of the replacement component 208, a network speed of the computing system, or other download metrics). The estimated time may be based on an amount of time needed to order, ship, and install a replacement hardware component 206.

In some embodiments, the order of reconfiguration may include the list of software/hardware components 206, 208 ordered by the ease of modifying the component 206, 208. A system implementing step 108 may include a database, API, or other data source that includes a component 206, 208 and a metric indicating the ease of modifying the component 206, 208. For example, updating a software component 208 to a new version or rolling the software component 208 back to a previous version may be easier than downloading a new software component 208 to replace the current software component 208. Modifying a software component 208 may be easier than replacing a hardware component 206. Removing a component 206, 208 may be easier than adding a new component 206, 208 or modifying a current component 206, 208.

In one or more embodiments, performing a defensive action on the computing system 202 (step 110) may include a moving target defensive action. Performing the defensive action may be in response to the overall risk score exceeding a pre-determined threshold risk score. In some embodiments, the defensing action may include automatically changing an Internet Protocol (IP) address or another type of network address of one or more computing devices 204(1)-(n) of the computing system 202. The defensive action may include automatically changing one or more port numbers of one or more computing devices 204(1)-(n) of the computing system 202. In some embodiments, the defensive action may include automatically modifying a software component 208 of the computing system 202 (including replacing a software component 208 or even the operating system (OS) of a computing device 204). The defensive action may include automatically monitoring for malware on the computing system 202 and killing one or more processes running on the computing system 202 may include malware. The defensive action may include automatically monitoring hardware usage in the computing system 202 and killing one or more processes that may be taxing on the performance of the hardware or have crashed but are still consuming system resources. In some embodiments, the defensive action may include automatically modifying a memory layout with address space layout randomization. The defensive action may include automatically disconnecting, deactivating, or otherwise disabling one or more peripheral devices connected to the computing system 202 (for example, if the peripheral device is vulnerable and not critical to the computing system 202).

In one or more embodiments, performing one or more defensive actions may reduce the attack surface of the computing system 202 and make it more resilient against cyber attacks while more complicated component 206, 208 replacement is in progress.

In some embodiments, one or more steps of the method 100 may be performed automatically, continuously, periodically, or in response to certain events. For example, the steps 102-108 may be performed continuously and constantly. The steps 102-108 may be performed daily, weekly, monthly, or at some other time interval. The steps 102-108 may be performed in response to the installation of a new software or hardware component 206, 208 or the update of a certain software component 208 (such as an OS, a frequently used software component 208, or a critical software component 208). The steps 102-108 may be performed in response to a computer vulnerabilities database/system updating or the discovery of a new computer vulnerability. The overall risk score of the computing system or the component risk scores for the components 206, 208 of the computing system 202 may be stored so that a system administrator or other user of the computing system 202 can check the risk score(s) and take any necessary action. In some embodiments, in response to one or more risk scores being above a certain threshold, a system implementing the method 100 may automatically send a notification to a system administrator (e.g., via email, short message service (SMS), or some other notification system).

The method 100 includes several benefits. By analyzing the computing system's 202 configuration to detect vulnerable components 206, 208, the method 100 can generate a reconfiguration order based on system needs and preferences and can automatically reconfigure or replace certain components. The method 100 allows computing system 202 designers and operators to determine secure configurations for newly designed computing systems 202 and components to reconfigure or replacing existing computing systems 202. The method 100 allows such personnel to evaluate how replacing one or more components 206, 208 may affect the overall risk score. The method 100 is an improvement to computing technology because it results in improving the security of the computing system 202, including automatically improving the security by automatically replacing certain components 206, 208 of the computing system 202.

Figure 4:
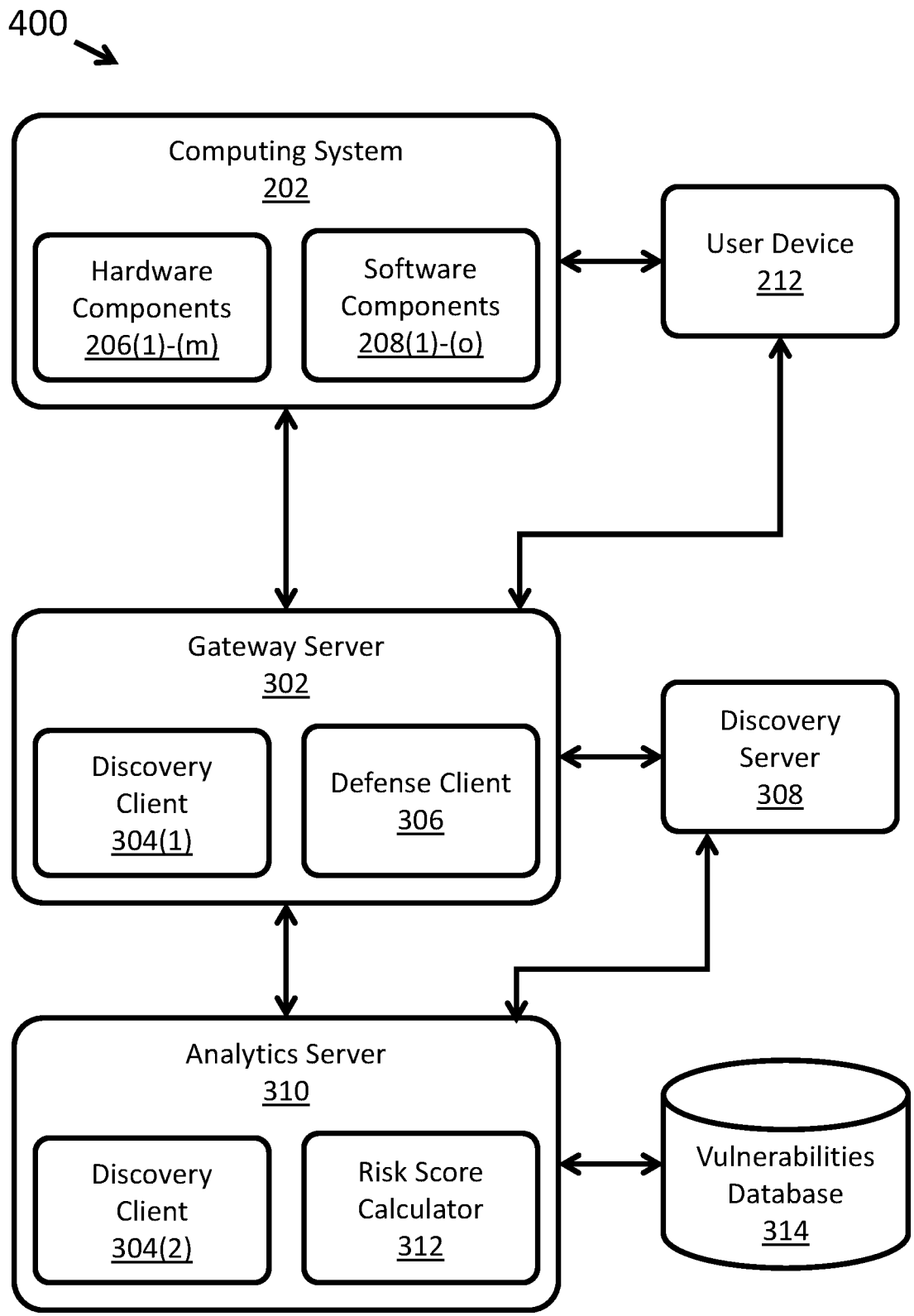
FIG. 4 is a schematic block diagram illustrating one embodiment of a system for cyber risk assessment for computing systems.

FIG. 4 depicts one embodiment of a system 400. The system 400 may include a system for cyber risk assessment for computing systems. The system 400 may implement one or more of the steps of the method 100 of FIG. 1.

The system 400 may include a computing system 202. The computing system 202 may include one or more hardware components 206(1)-(n) or one or more software components 208(1)-(m). The system 400 may include a user device 212. The computing system 202 and the user device 212 may be in data communication with each other over a data network (such as the data network 210 of FIG. 2).

The system 400 may include a gateway server 302. The gateway server 302 may include a discovery client 304(1). The gateway server 302 may include a defense client 306. The gateway server 302 may be in data communication with the computing system 202 or the user device 212 over a data network. The gateway server 302 may be in data communication with a discovery server 308 over a data network.

The system 400 may include an analytics server 310. The analytics server 310 may include a discovery client 304(2). The analytics server 310 may include a risk score calculator 312. The analytics server 310 may be in data communication with the gateway server 302 or the discovery server 308 over a data network. The analytics server 310 may be in data communication with a vulnerabilities database 314.

Further details regarding the elements of the system 400 are now discussed. In one embodiment, the computing system 202 may include the computing system discussed above for which the overall risk score will be calculated. The hardware components 206(1)-(m) or software components 208(1)-(o) may include the components discussed above for which individual risks scores will be determined. In some embodiments, the user device 212 may include a computing device. The user device 212 may include a computing device that controls or operates functionality on the computing system 202. The user device 212 may include a computing device from which a system administrator of the computing system 202 may send a request to the gateway server 302 to have various elements of the system 400 perform the method 100.

The system 400 may include a microservice style architecture. This may leverage the efficiency of computing resources and may allow the system 400 to more broadly serve a variety of computing systems 202. With a microservice design, the system 400 may fully support a REpresentational State Transfer (REST) implementation. As seen in FIG. 4, the system 400 may include three primary elements: the gateway server 302, the discovery server 308, and the analytics server 310. Each of these elements 302, 308, 310 may include their own role defined in the system 400. Each microservice executing on these elements 302, 308, 310 may use a RESTful process in which they communicate with each other. Some of the microservices may be implemented using an application framework that may allow the system 400 to easily adapt to different needs with the use of dependency injections. In some embodiments, the application framework may include Spring Boot for Java Development Kit (JDK).

The discovery server 308 may include a computing device. The discovery server 308 may include a discovery service executing on the computing device. The discovery service may include a microservice, as discussed above.

In one embodiment, the discovery service may allow one or more services of the system 400 to communicate with each other without hard coding ports or IP addresses, as these types of data can change on-the-fly. Using a discovery service may be easier to load balance, for example, when a system administrator needs to load more services due to high traffic times. In some embodiments, the discovery service may use a client side discovery model. In client side discovery, the client may not be the actual user, but instead may be another service. A client may send an initial request to a service registry to find the service it wants to communicate with. In one embodiment, the discovery client 304(1) of the gateway server 302 may send a request to the discovery server 308 requesting data on how the discovery client 304(1) can communicate with the analytics server 310. The discovery client 304(2) of the analytics server 310 may include similar functionality. The data received in response to such a request may include communication data, which may include one or more IP addresses, port numbers, or other data used in communications between the gateway server 302 and the analytics server 310.

In one or more embodiments, the discovery service model of the system 400 may include functionality that may handle functions in which a client or service can look up the name of a service then send requests. The discovery service model may include advanced caching. If a service route disappears, the service may cache the previous route for that service so the client may not have to wait for the connection to re-appear. A discovery client 304 may send out heartbeats to the service registry as a service. These are sent in case another service needs to know where it is located on a server or in the cloud. This may allow the service to be dynamically load balanced. In some embodiments, the discovery service model of the system 400 may include Eureka.

In one embodiment, the gateway server 302 may include a computing device. The gateway server 302 may be responsible for handling forward facing requests. Forward facing may include that if the user would execute a Domain Name Service (DNS) trace to the front end, the user would only see the IP address of the gateway server 302. The gateway server 302 may act like a router. Thus, depending on what the user wants to see, the gateway server 302 may route traffic to the services that are allowed for that user.

The gateway server 302 may receive a request from the user device 212. The request may include RESTful POST request. In some embodiments, the POST request may have been sent by a web browser of the user device 212. The web browser may have received a webpage from the gateway server's 302 web server in response to a system administrator navigating the web browser to a webpage of the gateway server 302 where the webpage includes a fillable form where the system administrator can input the component data of hardware components 206 and software components of the computing system 202. In certain embodiments, the POST request may have been sent from a microservice on the computing system 202 that has scanned the computing system 202 and gathered the component data. The data from this POST request is referred to as "system configuration data."

In one embodiment, the microservices of the system 400 may implement algorithms in different languages that may perform certain tasks better than in other languages. For example, the gateway server 302 may include a web server with a front-facing website. If the website were running in a compile type design, this may make the website's developer need to stop the server and re-compile every time a change is needed. However, the webserver may include a scripted language (e.g., PHP), which may allow the gateway server 302 to change code on-the-fly, such as hypertext markup language (HTML) that can be served to the user device 212. This may allow computationally intensive services able to run on more dedicated machines, such as the analytics server 310. Having a web interface may allow the system 400 to implement the "What If" functionality of step 106 over a software scanner that may allow users to test the computing system 202 with certain components 206, 208 rather than being forced to only evaluate what they already have in terms of installed software or hardware.

In one embodiment, the gateway server 302 may send data to the analytics server 310, and the data may be based on the system configuration data. The risk score calculator 312 may receive the data. The risk score calculator 312 may include a microservice or other software module of the analytics server 310. The risk score calculator 312 may use the system configuration data to calculate the overall risk score of the computing system 202 or one or more individual components 206(1)-($m$), 208(1)-($o$) of the computing system 202.

The risk score calculator 312 may store some of the system configuration data in order to query the vulnerabilities database 314. In one embodiment, the risk score calculator 312 may store the system configuration data in one or more Java objects. The risk score calculator 312 may include a query builder. The query builder may build a database query for one or more components 206, 208 in the system configuration data. The query may be executed in order to retrieve one or more CVE entries from a database or other data storage.

In some embodiments, a query may be built upon a base template. The template may include a Common Platform Enumeration (CPE). A CPE may follow a template in which a colon is used as a delimiter. A CPE template may be in the form:

{part}:{vendor}:{product}:{version}:{update}:{edition}:{language}

In one embodiment, "part" may include the value "application," "operating system," "hardware," or some other value. "Vendor" may include the name of the vendor of the component. "Product" may include the name of the component, or some other data used to uniquely identify the component. "Version" may include the version of the component. "Update" may include one or more vendor-specific alphanumeric strings that may characterize the particular update, service pack, or point release of the product. "Edition" may include edition-related terms applied by the vendor to the product. "Language" may include one or more language tags that may be used to define the language supported in a user interface of the product being described." In some embodiments, a language tag may be defined by a Request For Comments (RFC) document, for example RFC5646 of the Internet Engineering Task Force (IETF). In certain embodiments, a CPE may conform to a standard, template, or other format. The standard, template, or other format may include the Common Platform Enumeration: Naming Specification v. 2.3 provided by the National Institute of Standards and Technology (NIST).

In some CPEs, the value for the "version" part may not be in the CPE but, rather, may refer to other keys, such as "version start including" or "version end including." Hence, the query builder may construct regular expressions (regexes) in a database query.

Below is an example query that may be built by the query builder:

```
SELECT
DISTINCT cve_name,
CASE
WHEN version3_base=NULL then
version3_base=version2_base
WHEN version2_base=NULL then
version2_base=5.0
END,
COALESCE(version3_base,5.0) as version3_base,
cpe_column
FROM vercasm-cps_data
WHERE
(
cpe_column LIKE '%debian%10%x64%'
AND
cpe_column ~'cpe:2\.3:[o]:([\w]{0,40}):([\w]{0,40}):([a-z\d]{0,40})'
)
OR
(
cpe_column LIKE '%debian:%'
AND
cpe_column~'cpe:2\.3:[o]:([\w]{0,40}):([\w]{0,40}):\*:\*:\*:\*:\*:\*:\*'
)
OR
(
cpe_column LIKE '%debian%'
AND
(
version_start_including LIKE '%10%'
OR
version_end_including LIKE '%10%'
)
AND cpe_column~'cpe:2\.3:[o]:([\w]{0,40}):([\w]{0,40}):\*:\*:\*:\*:\*:\*:\*'
)
```

As can be seen in the above query, lines 16 and 33 include regular expressions for matching CPEs that have the name of the software and the version included. Line 22 includes a regular expression where there is no version included in the individual CPE. This regular expression may be queried twice: once if the CPE contains no version as mentioned, and another time if the versions are in other columns. If a CPE contains no version and there are no versions in other keys, the risk score calculator 312 may assume that a vulnerability is affected by all versions of that software. An additional example query is shown below:

```
SELECT cve.id, cve.cve_id, description_data_item.value as description,
cpe_uri.product as product, cvssv3.base_score as v3Base_score, cvssv2.base_score
as v2base_score,cpe_match_item.version_end_excluding,
cpe_match_item.version_end_including, cpe_match_item.version_start_including,
cpe_match_item.version_start_excluding, cpe_uri.edition, cpe_uri.morefields,
cpe_uri.part, cpe_uri.update as cupdate, cpe_uri.vendor, cpe_uri.version as cversion,
coalesce(cvssv3.base_score, cvssv2.base_score) as coalesce_score
    FROM public.cveitems_item
    FULL JOIN cve
    ON cveitems_item.cvedata_id = cve.id
    INNER JOIN description
    ON cve.description_id = description.id
    INNER JOIN description_description_data
    ON description.id = description_description_data.description_id
    INNER JOIN description_data_item -- get description for all CVE'sON
description_description_data.description_data_id = description_data_item.id
    INNER JOIN configurations -- Start line of joins to get CPE information
    ON cveitems_item.conf_id = configurations.id
    INNER JOIN configurations_nodes
    ON configurations.id = configurations_nodes.config_id
    INNER JOIN nodes_item
    ON configurations_nodes.nodes_id = nodes_item.id
    INNER JOIN nodes_item_cpe_match
    ON nodes_item.id = nodes_item_cpe_match.nodes_item_id
    INNER JOIN cpe_match_item
    ON nodes_item_cpe_match.cpe_match_id = cpe_match_item.id
    INNER JOIN cpe_uri
    ON cpe_match_item.parent_type_cpe_uri = cpe_uri.id
    INNER JOIN impact
    ON cveitems_item.impact_id = impact.id --start impact line of joins
    INNER JOIN base_metricv3 -- Version 3 CVSS first
    ON impact.base_metricv3_id = base_metricv3.id
    INNER JOIN cvssv3
    ON base_metricv3.cvssv3_id = cvssv3.id
```

```
INNER JOIN base_metricv2 -- Version 2 CVSS now
ON impact.base_metricv2_id = base_metricv2.id
INNER JOIN cvssv2
ON base_metricv2.cvssv2_id = cvssv2.id
WHERE product = X
AND
vendor = Y
```

As can be seen by the above query the JOIN statements combine multiple tables in to find CVE data in relation to a selected product X and matching vendor Y. This data includes the necessary information for risk score calculator 312 to compute component risk score for matching product X and vendor Y.

The database query may SELECT a 'cve_name' attribute, which is what the analytics server 310 may use as an ID. This may include the name of a CVE record, for example, CVE-2021-33910. Since multiple CPEs can be determined for each CVE record, the query may use the DISTINCT operator. This may only return the base score of each CVE record for a CPE that matches with it. To retrieve the CVE records for a given software or hardware CPE that exists, the database query may continue to check the cpe_column attribute. This may represent the individual CPEs.

Once the query is formatted and validated, the risk score calculator 312 may execute the query on the vulnerabilities database 314. In one embodiment, the risk score calculator 312 may use a CRUD-based API where CRUD represents: Create, Read, Update, and Delete. The database may return one or more CVE entries as a response to the query.

A CVE entry may include its own CVSS score. A CVSS score may be based on a wide range of metrics such as attack vector, user interaction, and the Confidentiality, Integrity, and Availability impacts. The CVSS score may be one of two referenced versions: CVSS2 or CVSS3. The risk score calculator 312 may prioritize the newest version of the scoring system. However, some CVE entries, which can date back to 1999, may only contain a version 2 score. Thus, the risk score calculator 312 may select the CVSS score version based on the following: (1) if the CVSS3 score is null, then the risk score calculator 312 assigns the component 206, 208 the CVSS2 score; (2) if the CVSS2 score is null, then the risk score calculator 312 assigns the component 206, 208 a pre-determined value; (3) if any component risk score remains null, then the risk score calculator 312 assigns the component 206, 208 a pre-determined value. The predetermined value may include a median score (e.g., 5.0 where risk scores range from 0.0 to 10.0) or some other value. The risk score calculator 312 may include fewer or more rules and may include different rules than those discussed above.

In one embodiment, the risk score calculator 312 may gather the component risk scores for each of the components 206, 208 or the system data configuration and perform the functionality described above in relation to step 102 in order to calculate the overall risk score for the computing system 202.

In some embodiments, the analytics server 310 may carry out the steps 104-108 of the method 100. In some embodiments, the risk score calculator 312 may determine modifications to one or more software components 208(1)-(o) or hardware components 206(1)-(m) of the computing system 202 (step 104). The risk score calculator 312 may retrieve data from a database (which may reside on the analytics server 310 or some other server) in order to determine the modifications, as described above in relation to step 104.

The analytics server 310 may perform a sensitivity analysis on the computing system 202 (step 106).

In one embodiment, the analytics server 310 may generate an order of reconfiguring or replacing vulnerable components 204(1)-(n), 206(1)-(m) of the computing system 202 (step 108). This may include the analytics server 310 sending the order to the gateway server 302, and the gateway server 302 sending the order to the user device 212. For example, the gateway server 302 may send a webpage that includes the order and may contain other information for the system administrator of the computing system 202. The gateway server 302 may send an email, SMS message, or other message to the user device 212 that may include the order.

In one embodiment, the defense client 306 of the gateway server 302 may perform the defensive action on the computing system 202 (step 110). The defense client 306 may include a microservice executing on the gateway server 302. The defense client 306 may be in data communication with a defense service installed on the computing system 202. In one embodiment, the defense client 306 may include Salt provided by VMware, Inc.

In some embodiments, the network configuration changes may be performed by scripts located on one or more computing devices of the computing system 202 that have sufficient computational power. The defense client 306 may cause the execution of the one or more scripts. These scripts may include shell scripts. The defense client 306 may be based on a master and minion system. This is where the minions may know the IP address of the master, and the master can send instructions to the minions. Instructions can be sent to any number of minions at once, so it may be possible to change the configurations of multiple computing devices at once or individual devices. The defense client 306 may include the master, and the service installed on the computing system 202 may include the minions.

In some embodiments, the computing system 202 may include the user device 212. In one or more embodiments, certain elements of the system 400 shown as separate elements in FIG. 4 may reside on the same computing device. For example, the gateway server 302, the discovery server 308, and the analytics server 310 may reside on the same server. In some embodiments, the vulnerabilities database 314 may reside on the analytics server 310.

In one embodiment, certain elements of the system 400, such as the gateway server 302, the discovery server 308, or the analytics server 310, may be packaged into the form of a virtualized and distributed computing environment. In some embodiments, a caching technique and batch processing may be used to improve performance. The system 400 may use a secure data container to store configurations used in one or more microservices. The secure data container may support fine-grained role-based or attribute-based access control. The secure data container may be integrated with a database management system.

While the making and using of various embodiments of the present disclosure are discussed in detail herein, it should be appreciated that the present disclosure provides many applicable inventive concepts that are embodied in a wide variety of specific contexts. The specific embodiments discussed herein are merely illustrative of specific ways to make and use the disclosure and do not delimit the scope of the disclosure. Those of ordinary skill in the art will recognize numerous equivalents to the specific apparatuses, systems, and methods described herein. Such equivalents are considered to be within the scope of this disclosure and may be covered by the claims.

Furthermore, the described features, structures, or characteristics of the disclosure may be combined in any suitable manner in one or more embodiments. In the description contained herein, numerous specific details are provided, such as examples of programming, software, user selections, hardware, hardware circuits, hardware chips, or the like, to provide understanding of embodiments of the disclosure. One skilled in the relevant art will recognize, however, that the disclosure may be practiced without one or more of the specific details, or with other methods, components, materials, apparatuses, devices, systems, and so forth. In other instances, well-known structures, materials, or operations may not be shown or described in detail to avoid obscuring aspects of the disclosure.

These features and advantages of the embodiments will become more fully apparent from the description and appended claims, or may be learned by the practice of embodiments as set forth herein. As will be appreciated by one skilled in the art, aspects of the present disclosure may be embodied as an apparatus, system, method, computer program product, or the like. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present disclosure may take the form of a computer program product embodied in one or more computer-readable media having program code embodied thereon.

In some embodiments, a module may be implemented as a hardware circuit comprising custom (very large-scale integration) VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer-readable media.

In some embodiments, a module may include a smart contract hosted on a blockchain. The functionality of the smart contract may be executed by a node (or peer) of the blockchain network. One or more inputs to the smart contract may be read or detected from one or more transactions stored on or referenced by the blockchain. The smart contract may output data based on the execution of the smart contract as one or more transactions to the blockchain. A smart contract may implement one or more methods or algorithms described herein.

The computer program product may include a computer-readable storage medium (or media) having computer-readable program instructions thereon for causing a processor to carry out aspects of the present disclosure. The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium may include a portable computer diskette, a random access memory ("RAM"), a read-only memory ("ROM"), an erasable programmable read-only memory ("EPROM" or Flash memory), a static random access memory ("SRAM"), a hard disk drive ("HDD"), a solid state drive, a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a Local Area Network (LAN) or a Wide Area Network (WAN), or the connection may be made to an external computer (for example, through the Internet using an Internet Service Provider). In some embodiments, electronic circuitry including, for example, programmable logic circuitry, Field-Programmable Gate Arrays (FPGA), or Programmable Logic Arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations or block diagrams of methods, apparatuses, systems, algorithms, or computer program products according to embodiments of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The schematic flow chart diagrams included herein are generally set forth as logical flow chart diagrams. As such, the depicted order and labeled steps are indicative of one embodiment of the presented method. Other steps and methods may be conceived that may be equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The schematic flowchart diagrams and/or schematic block diagrams in the Figures illustrate the architecture, functionality, and operation of possible implementations of apparatuses, systems, methods and computer program products according to various embodiments of the present disclosure. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Thus, although there have been described particular embodiments of the present disclosure of a new and useful SYSTEMS AND METHODS FOR CYBER RISK ASSESSMENT FOR COMPUTING SYSTEMS, it is not intended that such references be construed as limitations upon the scope of this disclosure.

What is claimed is:

1. A system for cyber risk assessment for computing systems, comprising:
    a gateway server, including
        a discovery client, and
        a defense client,
        wherein the gateway server is in data communication with a computing system;
    a discovery server in data communication with the gateway server; and
    an analytics server, including
        a discovery client, and
        a risk score calculator microservice,
        wherein the analytics server is in data communication with the discovery server and a vulnerabilities database,
    wherein the risk score calculator microservice is configured to
        compute a risk score for a computing system, wherein the computing system includes one or more components, wherein the one or more components include one or more physical components and one or more software components, and the risk score includes a value indicating a risk of exploitation of the computing system, determine one or more modifications to at least one of the one or more components of the computing system, wherein the one or more modifications increase the security of the computing system, perform a sensitivity analysis on the computing system, and generate an order of reconfiguring or replacing vulnerable components of the computing system, and wherein the defense client is configured to perform a defensive action on the computing system.

2. The system of claim 1, wherein each of the discovery client of the gateway server and the discovery client of the analytics server receive communication data from the discovery server, wherein the communication data includes data indicating how the gateway server and the analytics server can communicate with each other.

3. The system of claim 1, wherein:

the gateway server is configured to receive a POST request from a computing device in data communication with the computing system; and the POST request includes system configuration data of the computing system, wherein the system configuration data includes data identifying one or more hardware components and one or more software component of the computing system.

4. The system of claim 3, wherein:

the analytics server is configured to receive the system configuration data from the gateway server;

the risk score calculator microservice includes a query builder; and the risk score calculator is configured to generate a database query based on the system configuration data, and execute the database query on the vulnerabilities database.

* * * * *